US010690182B2

(12) United States Patent
Catalano

(10) Patent No.: US 10,690,182 B2
(45) Date of Patent: Jun. 23, 2020

(54) ROLLER BEARING FOR SUPPORTING RADIAL DEFORMATION OF THE ROLLER BEARING, AND ROTATIVE ASSEMBLY COMPRISING SUCH ROLLER BEARING

(71) Applicant: Aktiebolaget SKF, Gothenburg (SE)

(72) Inventor: Denis Catalano, Nièvre (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 16/115,710

(22) Filed: Aug. 29, 2018

(65) Prior Publication Data

US 2019/0136910 A1    May 9, 2019

(30) Foreign Application Priority Data

Nov. 8, 2017  (DE) .......... 10 2017 219 823

(51) Int. Cl.
| F16C 19/38 | (2006.01) |
| F16C 33/58 | (2006.01) |
| F16C 19/50 | (2006.01) |
| F16C 33/36 | (2006.01) |
| F16C 33/60 | (2006.01) |

(52) U.S. Cl.
CPC .......... F16C 19/381 (2013.01); F16C 19/505 (2013.01); F16C 33/363 (2013.01); F16C 33/585 (2013.01); F16C 33/60 (2013.01); F16C 2300/14 (2013.01)

(58) Field of Classification Search
CPC ........ F16C 19/14; F16C 19/18; F16C 19/188; F16C 19/38; F16C 19/381; F16C 19/44; F16C 19/48; F16C 19/505; F16C 2360/31; F16C 33/585; F16C 33/363
See application file for complete search history.

(56) References Cited

U.S. PATENT DOCUMENTS

| 9,605,709 B2 | 3/2017 | Kaesler | |
| 2009/0175724 A1* | 7/2009 | Russ ..................... | F03D 1/0658 416/131 |
| 2009/0324151 A1* | 12/2009 | Craig ..................... | F16C 19/52 384/448 |
| 2011/0115233 A1* | 5/2011 | Schroppel ............. | F03D 7/0224 290/55 |
| 2014/0010492 A1* | 1/2014 | Bouron .................. | F16C 19/38 384/608 |
| 2015/0078698 A1* | 3/2015 | Capoldi ................ | F16C 33/585 384/569 |

(Continued)

FOREIGN PATENT DOCUMENTS

EP    2092204 B1    8/2012

*Primary Examiner* — Alan B Waits
(74) *Attorney, Agent, or Firm* — Garcia-Zamor Intellectual Property Law, LLC; Ruy Garcia-Zamor; Bryan Peckjian

(57) ABSTRACT

A roller bearing having a rotatable first ring and a non-rotatable second ring arranged concentrically, the first ring having a circumferential groove opening towards the non-rotatable second ring into which is arranged a protruding element, between which are arranged a single radial roller bearing and two axial roller bearings spaced apart in the axial direction respectively on opposite radial faces of the protruding element. The roller bearing includes a plurality of circumferentially spaced apart cam followers secured to the rotatable first ring.

10 Claims, 3 Drawing Sheets

(56) References Cited

U.S. PATENT DOCUMENTS

| | | | |
|---|---|---|---|
| 2015/0098669 A1* | 4/2015 | Catalano | B23P 19/04 384/484 |
| 2016/0084312 A1* | 3/2016 | Ban | F16C 19/38 384/569 |
| 2016/0245333 A1* | 8/2016 | Fiesel | F16C 19/381 |

* cited by examiner

ROLLER BEARING FOR SUPPORTING RADIAL DEFORMATION OF THE ROLLER BEARING, AND ROTATIVE ASSEMBLY COMPRISING SUCH ROLLER BEARING

CROSS-REFERENCE

This application claims priority to German patent application no. 102017219823.0 filed on Nov. 8, 2017, the contents of which are fully incorporated herein by reference.

TECHNOLOGICAL FIELD

The present invention relates to the field of rolling bearings for absorbing axial and radial forces and having a first bearing ring and a second bearing ring arranged concentrically about an axis of rotation running in an axial direction.

BACKGROUND

The invention relates more particularly to the field of large-diameter cylindrical roller bearings, notably those used in a tunnel boring machine, or in the field of defence such as radars, char, or excavator applications. Large-diameter roller bearings may also be used for the mounting of rotor blades on wind turbines.

SUMMARY

A large-diameter rolling bearing comprises generally two concentric inner and outer rings, and a bearing assembly comprising two rows of axial bearing rollers and one row of radial bearing rollers. Such rolling bearings are generally loaded, both axially and radially, often with a relatively strong load.

Depending on the use of cylindrical roller bearing, considerable forces may arise, which may cause deformation of the bearing, notably of the rotating ring, leading in some cases, to locally separate the rings.

Reference can be made to document EP 2 092 204 B1 which describes a cylindrical roller bearing having two opposite rows of radial cylindrical rollers and two opposite rows of axial cylindrical rollers disposed in such a way to surround a nose ring of a rotating ring.

However, radial dimension of such roller bearing is considerably increased. Furthermore, it is not possible to add the fourth row of cylindrical rollers on existing structure without proceeding to important modifications.

One aim of the present invention is to overcome these drawbacks.

It is a particular object of the present invention to provide a rolling bearing capable of absorbing axial and radial loads as well as supporting radial deformation which may occur under high radial loads, while being compact notably in radial direction.

In one embodiment, a roller bearing comprises a rotatable first ring and a non-rotatable second ring which are arranged concentrically about a first rotation axis running in an axial direction, the rotatable first ring being configured to rotate with respect to the non-rotatable second ring around the first rotation axis.

The rotatable first ring comprises a circumferential groove opening in a radial direction towards the non-rotatable second ring into which is arranged a protruding element or lobe of the non-rotatable second ring extending towards the rotatable first ring.

Between the protruding element and the circumferential groove there is arranged at least one radial roller bearing having a row of radial cylindrical rollers having a rotation axis parallel to the rotation axis of the roller bearing, and at least two axial roller bearings each having a row of axial cylindrical rollers spaced apart in the axial direction respectively on opposite radial faces of the protruding element.

The roller bearing further comprises a plurality of circumferentially spaced apart cam followers rotatably secured to the rotatable first ring.

In case of radial deformation of the rotatable ring, the cam followers come into radial contact with a surrounding housing avoiding the rotatable ring to be locally separated in an outward direction from the non-rotatable ring.

In another embodiment, the roller bearing further comprises an axial projection extending towards the rotatable ring and separated from the outer cylindrical surface of the outer rings of the cam followers by a radial gap, the radial gap being configured in a such a way that the cam followers come in radial contact with the projection under radial load of the roller bearing leading to deformation of the rotatable first ring.

The cam followers are thus configured to support radial deformation of the rotatable ring.

Thanks to the cam followers and the axial projection, the rotatable ring, in this case the rotatable ring cannot be locally separated in an outward direction from the non-rotatable ring in case of deformation of the rotatable ring.

Under no load conditions, there is a radial gap between the axial projection and the outer cylindrical surface of the outer rings of the cam followers; there is thus no radial contact with the projection.

Under load conditions the outer cylindrical surface of the outer rings of the cam followers are in radial contact with the projection.

Considering the outer cylindrical surface of each stud of the cam followers as a raceway for the needle rollers, the axis of the raceway is offset compared to the axis of the raceway of the axial projection.

Advantageously, each cam follower comprises an outer ring and a stud forming an inner ring arranged concentrically about a second rotation axis running in an axial direction offset from the first axis of rotation. Each cam follower further comprises a set of needle rollers provided between raceways respectively of the inner cylindrical surface of the outer ring and the outer cylindrical surface of the stud.

The outer rings are thus not in direct contact with the studs, since needle rollers mobile compared to the outer rings are disposed between the outer rings and the studs.

The stud is secured in the rotatable first ring, notably on a lower radial surface.

For example, the cam followers are arranged on at least one circumferential portion of the rotatable ring, notably on the portion more subjected to radial deformation. For example, the circumferential portion of the rotatable ring is comprised between 15° and 120°, for example equal to 90°.

Alternatively, the cam followers could be arranged on the whole circumference of the rotatable ring.

The rotatable ring is, for example, divided in the axial direction in two parts, a support part to which is secured the cam followers and a holding part secured to the support part and adapted to be secured to a rotating component on a side opposite to the cam followers.

In one embodiment, the rotatable first ring is the outer ring and the non-rotatable second ring is the inner ring.

As an alternative, the rotatable first ring could be the inner ring whereas the non-rotatable second ring could be the outer ring.

In case the rotatable first ring is the outer ring, the circumferential groove opens in a radial direction inwardly towards the non-rotatable second ring and the rotation axis.

In one embodiment, the non-rotatable ring comprises the axial projection extending towards the rotatable ring and separated from the outer cylindrical surface of the outer rings of the cam followers by a radial gap.

The non-rotatable ring is, for example, divided in the axial direction in a first part forming a toothing ring and a second part adapted to be secured to a non-rotating component, the second part having the axial projection.

The rollers are, for example, arranged in a depression of the groove. Alternatively, a corresponding depression may also be provided in the end surface of the protruding element. The radial cylindrical rollers roll between raceways provided respectively on the groove and the protruding element. The rotation axis of the radial roller bearing is coaxial with the rotation axis.

The cylindrical rollers of the first axial roller bearing have a rotation axis perpendicular to the rotation axis of the roller bearing. The outer cylindrical surface of each first axial cylindrical roller rolls between raceways provided respectively on the groove and the protruding element. The cylindrical rollers of the second axial roller bearing have a rotation axis perpendicular to the rotation axis of the roller bearing. The outer cylindrical surface of each second axial cylindrical roller rolls between raceways provided respectively on the groove and the protruding element.

According to another aspect, the invention concerns a rotative assembly comprising a rotating component, a non-rotating component and a roller bearing as describes above.

According to another aspect, the invention concerns a rotative assembly comprising a rotating component, a non-rotating component and a roller bearing comprising a rotatable first ring and a non-rotatable second ring which are arranged concentrically about a first rotation axis running in an axial direction, the rotatable first ring being configured to rotate with respect to the non-rotatable second ring around the first rotation axis. The rotatable first ring comprises a circumferential groove opening in a radial direction towards the non-rotatable second ring into which is arranged a protruding element or lobe extending towards the rotatable first ring. Between the protruding element and the circumferential groove there is arranged a single radial roller bearing having a row of radial cylindrical rollers having a rotation axis parallel to the rotation axis of the roller bearing, and two axial roller bearings each having a row of axial cylindrical rollers spaced apart in the axial direction respectively on opposite radial faces of the protruding element. The roller bearing further comprises a plurality of circumferentially spaced apart cam followers rotatably secured to the rotatable first ring and in that the roller bearing comprises an axial projection extending towards the rotatable ring and separated from the outer cylindrical surface of the outer rings of the cam followers by a radial gap, the cam followers being configured to come in radial contact with the projection under radial load of the roller bearing leading to a radial deformation of the rotatable ring, notably the support part.

The non-rotatable ring is a single toothing ring secured to the non-rotating component, and the non-rotating component comprises the axial projection.

BRIEF DESCRIPTION OF THE DRAWINGS

The present invention and its advantages will be better understood by studying the detailed description of specific embodiments given by way of non-limiting examples and illustrated by the appended drawings on which

DETAILED DESCRIPTION

Figure 1:
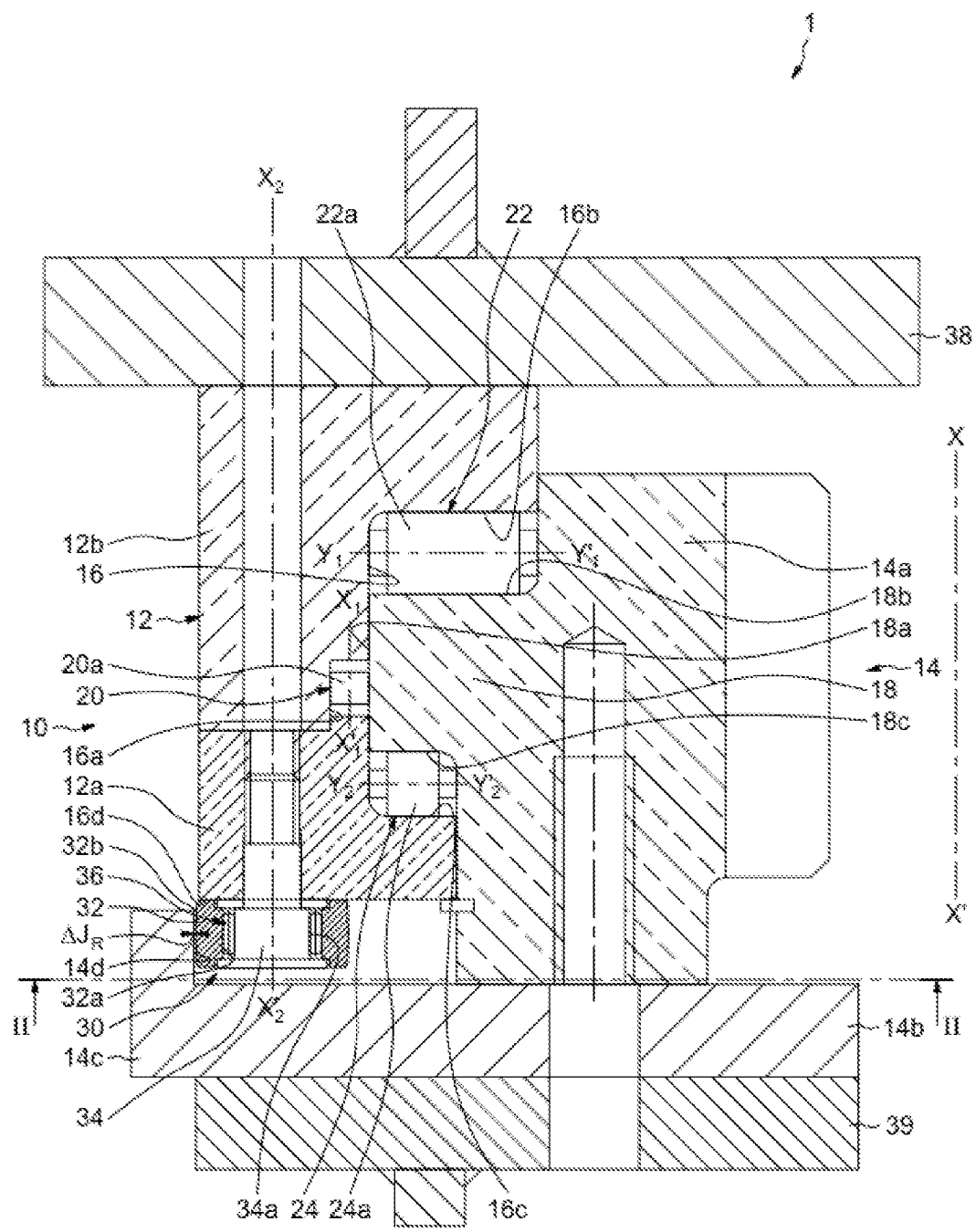
FIG. 1 is a partial cross section of a rotative assembly having a roller bearing according to first embodiment of the invention.
Figure 2:
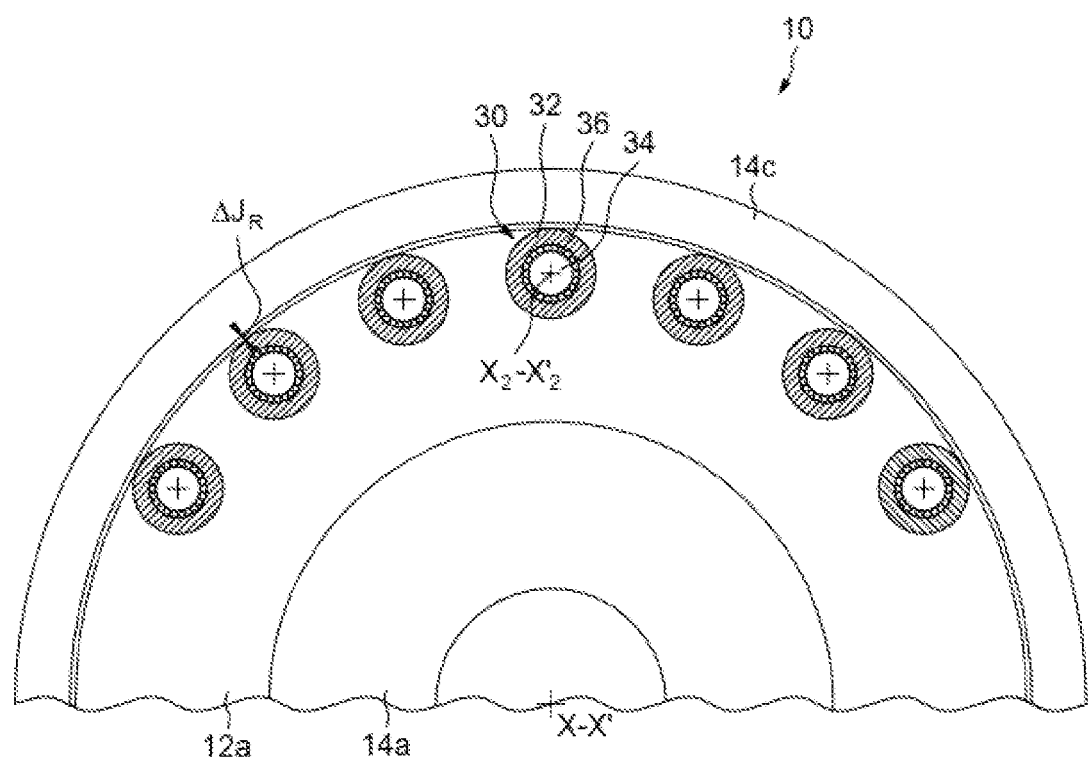
FIG. 2 is a schematic cross section of the roller bearing along line II-II of FIG. 1.

A first embodiment of a rotative assembly 1 is illustrated on FIGS. 1 and 2, the assembly may for example be used in a tunnel boring machine, an oil pumping installation or any other applications using a large diameter rolling bearing.

The rotative assembly 1 comprises roller bearing 10 having a rotatable first ring 12 and a non-rotatable second ring 14 which are arranged concentrically about a first rotation axis X-X' running in an axial direction. The rotatable first ring 12 is configured to rotate with respect to the non-rotatable second ring 14 around the rotation axis X-X'.

As illustrated, the rotatable first ring 12 is the outer ring of the rotative assembly whereas the non-rotatable second ring 14 is the inner ring of the roller bearing 10. As an alternative, the rotatable first ring could be the inner ring of the rotative assembly whereas the non-rotatable second ring could be the outer ring of the rotative assembly.

The rotatable first ring 12 has a circumferential groove 16 opening in a radial direction inwardly towards the non-rotatable second ring 14 and the rotation axis.

The non-rotatable second ring 14 comprises a protruding element or lobe 18 extending towards the rotatable first ring 12 and arranged in the circumferential groove 16 of the rotatable first ring 12.

Between the lobe 18 and the groove 16 there is arranged a single radial roller bearing 20 having a row of radial cylindrical rollers 20a having a rotation axis X1-X1' parallel to the first rotation axis X-X' of the roller bearing 10. The rollers are in this case arranged in a depression 16a of the groove 16. Alternatively, a corresponding depression may also be provided in the end surface 18a of the lobe 18. The radial rollers 20a roll between raceways 16a, 18a provided respectively on the groove 16 and the lobe 18. The rotation axis of the radial roller bearing 20 is coaxial with the rotation axis X-X'. The end surface 18a of the lobe 18 forms a raceway for the radial rollers 20a.

Two axial roller bearings 22, 24 each having a row of axial cylindrical rollers 22a, 24a spaced apart in the axial direction respectively on opposite radial faces 18b, 18c of the lobe 18.

The cylindrical rollers 22a of the first axial roller bearing 22 have a rotation axis Y1-Y1' perpendicular to the rotation axis X-X' of the roller bearing 10. The outer cylindrical surface of each first axial cylindrical roller 22a rolls between raceways 16b, 18b provided respectively on the groove 16 and the lobe 18. The first radial face 18b of the lobe 18 forms a raceway for the first axial cylindrical roller 22a. The cylindrical rollers 24a of the second axial roller bearing 24 have a rotation axis Y2-Y2' perpendicular to the rotation axis X-X' of the roller bearing 10. The outer cylindrical surface of each second axial cylindrical roller 24a rolls between raceways 16c, 18c provided respectively on the groove 16 and the lobe 18. The second radial face 18c of the lobe 18 forms a raceway for the second axial cylindrical roller 24a.

The roller bearing 10 comprises a plurality of circumferentially spaced apart cam followers 30 secured to the rotatable first ring 12. Each cam follower 30 comprises an outer ring 32 and a stud 34 forming an inner ring arranged concentrically about a rotation axis X2-X2' running in an axial direction parallel to the axis of rotation X-X' of the roller bearing 10. A set of needle rollers 36 are provided between raceways 32a, 34a respectively of the inner cylindrical surface of the outer ring 32 and the outer cylindrical surface of the stud 34. The stud 34 is secured in the rotatable first ring 12, notably on a lower radial surface 16d. The outer rings 32 are thus not in direct contact with the studs 34, since needle rollers 36 mobile compared to the outer rings are disposed between the outer rings 32 and the studs 34.

Considering the outer cylindrical surface 34a of each stud 34 of the cam followers 30 as a raceway for the needle rollers 36, the axis X2-X2' of the raceway is offset compared to the axis of the raceway 14d of the axial projection 14c.

As can be seen on FIG. 2, the cam followers 30 are arranged on at least one circumferential portion of the rotatable ring 12, notably on the portion more subjected to radial deformation. As a non limiting example, the circumferential portion of the rotatable ring is equal to 100° and comprises seven spaced apart cam followers 30.

Alternatively, the cam followers 30 could be arranged on a circumferential portion of the rotatable ring comprised between 15° and 120° or on the whole circumference of the rotatable ring 12.

As shown on FIG. 1, the rotatable ring 12 is divided in the axial direction in two parts 12a, 12b, a support part 12a to which is rotatably secured the cam followers 30 and a holding part 12b secured at one end to the support part 12a and at the opposite end to a rotating component 38, on a side opposite to the cam followers 30.

In this embodiment, the non-rotatable ring 14 is also divided in the axial direction in a first part 14a forming a toothing ring and a second part 14b secured to a fixed component 39.

The second part 14b comprises an axial projection 14c extending towards the rotatable ring 12 and onto which bears radially the outer cylindrical surface 34b of the outer rings 34 of the cam followers 30 in case of radial deformation of the rotatable ring 12.

Under no load conditions, there is a radial gap ΔIR between the axial projection 14c and the outer cylindrical surface 32b of the outer rings 32 of the cam followers 30; there is thus no radial contact with the projection 14c.

Under load conditions, such as radial load of the roller bearing leading to a radial deformation of the rotatable ring, notably the support part, the outer cylindrical surface 32b of the outer rings 32 of the cam followers 30 come in radial contact with an axial surface 14d of the projection 14c.

Figure 3:
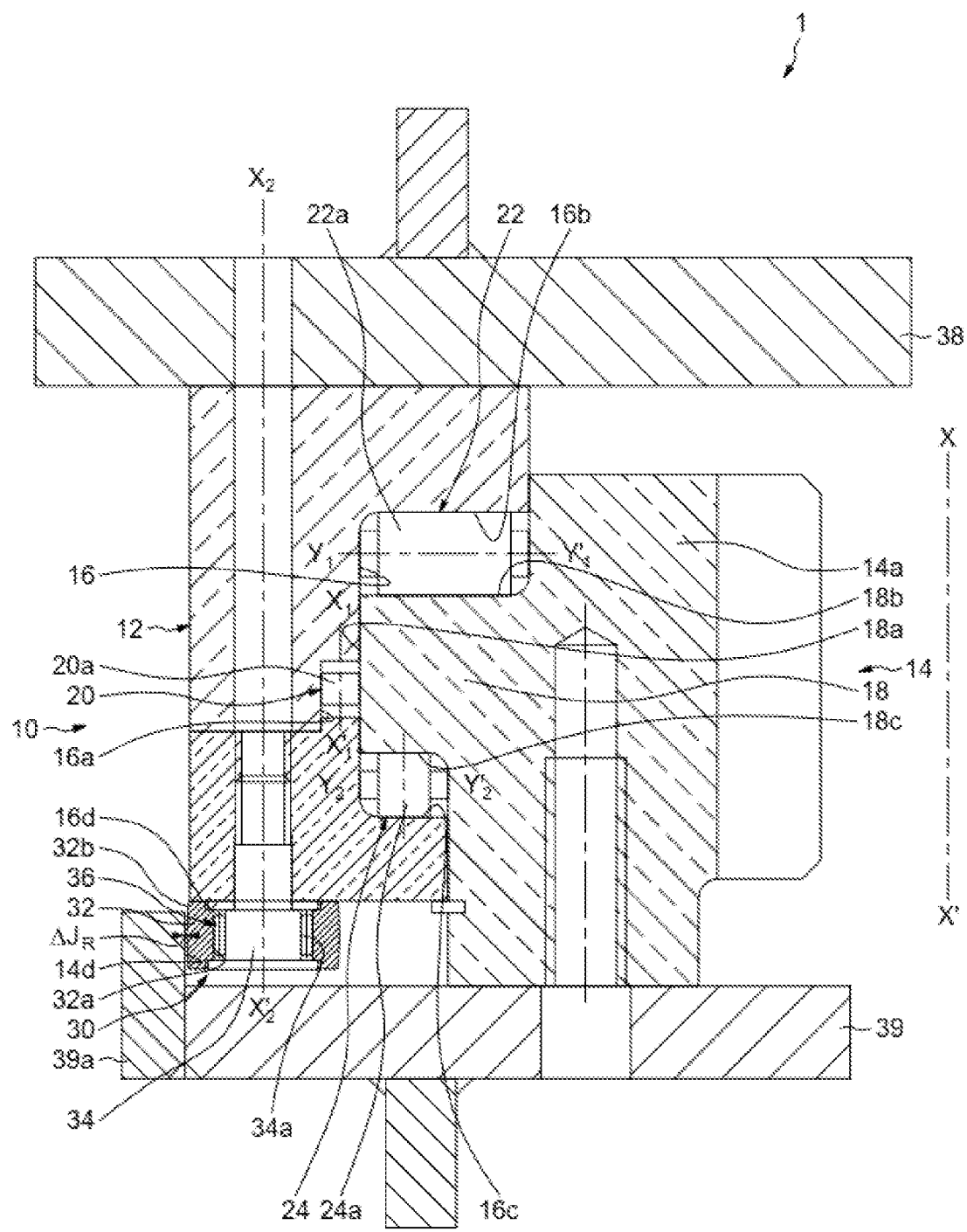
FIG. 3 is partial cross section of a rotative assembly having a roller bearing according to a second embodiment of the invention.

As shown on FIG. 3, in which the same elements bear the same references, differ from the embodiment of FIG. 1 only by the fact that the non-rotatable ring 14 is in a one piece toothed ring 14a secured to a fixed/non-rotatable component 39 having an axial projection 39a extending towards the rotatable ring 12 and onto which bears radially the outer rings of the cam followers in case of radial deformation of the rotatable ring 12.

Thanks to the cam followers, the rotatable ring, in this case the outer ring cannot be locally separated in an outward direction from the non-rotatable ring in case of radial load leading to radial deformation of the outer ring.

What is claimed is:

1. A roller bearing comprising:
    a rotatable first ring, and
    a non-rotatable second ring that are arranged concentrically about a first rotation axis running in an axial direction, the rotatable first ring being configured to rotate with respect to the non-rotatable second ring around the first rotation axis, the rotatable first ring having a circumferential groove opening in a radial direction towards the non-rotatable second ring into which is arranged a protruding element of the rotatable second ring extending towards the rotatable first ring, wherein
    between the protruding element and the circumferential groove there being arranged at least one radial roller bearing having a row of radial cylindrical rollers, and at least two axial roller bearings each having a row of axial cylindrical rollers spaced apart in the axial direction respectively on opposite radial faces of the protruding element, wherein
    the roller bearing comprises a plurality of circumferentially spaced apart cam followers rotatably secured to the rotatable first ring.

2. The roller bearing according to claim 1, further comprises an axial projection extending towards the rotatable ring and separated from the outer cylindrical surface of the cam followers by a radial gap, the radial gap being configured in such a way that the cam followers come in radial contact with the projection under radial load of the roller bearing leading to deformation of the rotatable first ring.

3. The roller bearing according to claim 1, wherein each cam follower comprises an outer ring and a stud forming an inner ring arranged concentrically about a second rotation axis running in an axial direction offset from the first axis of rotation, each cam follower further comprises a set of needle rollers provided between raceways respectively of the inner cylindrical surface of the outer ring and the outer cylindrical surface of the stud.

4. The roller bearing according to claim 1, wherein the cam followers are arranged on a circumferential portion of the rotatable ring comprised between 15° and 120°.

5. The roller bearing according to claim 1, wherein the rotatable ring is divided in the axial direction in at least two parts, a support part to which are secured the cam followers and a holding part secured to the support part and adapted to be secured to a rotating component on a side opposite to the cam followers.

6. The roller bearing according to claim 1, wherein the rotatable first ring is the outer ring and the non-rotatable second ring is the inner ring.

7. The roller bearing according to claim 1, wherein the non-rotatable ring comprises the axial projection extending towards the rotatable ring and separated from the outer cylindrical surface of the outer rings of the cam followers by a radial gap.

8. The roller bearing according to claim 7, wherein the non-rotatable ring is divided in the axial direction in a first part forming a toothing ring and a second part adapted to be secured to a fixed component, the second part having the axial projection.

9. A rotative assembly comprising:
    a rotating component,
    a non-rotating component, and
    a roller bearing according to claim 1.

10. A rotative assembly comprising:
    a rotating component,
    a non-rotating component, and
    a roller bearing according to claim 1, wherein the non-rotatable ring is a single toothing ring secured to the non-rotating component, and wherein the non-rotating component comprises the axial projection.

* * * * *